(12) United States Patent
Dammar et al.

(10) Patent No.: US 8,211,591 B2
(45) Date of Patent: Jul. 3, 2012

(54) SUBGASKET WINDOW EDGE DESIGN RELIEF

(75) Inventors: Chad A. Dammar, Rochester, NY (US);
Saurabh Vyas, Rochester, NY (US);
Ronald L. James, North Chili, NY (US); Matthew J. Beutel, Webster, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 652 days.

(21) Appl. No.: 12/208,834

(22) Filed: Sep. 11, 2008

(65) Prior Publication Data
US 2010/0062320 A1    Mar. 11, 2010

(51) Int. Cl.
*H01M 2/08* (2006.01)
*H01M 2/14* (2006.01)
*H01M 2/38* (2006.01)
*H01M 2/40* (2006.01)
*H01M 8/24* (2006.01)
*H01M 8/10* (2006.01)
*H01M 8/00* (2006.01)

(52) U.S. Cl. ........ 429/508; 429/457; 429/458; 429/480; 429/507; 429/535

(58) Field of Classification Search .................. 429/469, 429/457, 458, 507, 508, 480, 535
See application file for complete search history.

(56) References Cited

U.S. PATENT DOCUMENTS

| | | | |
|---|---|---|---|
| 7,833,673 B2 * | 11/2010 | Morimoto et al. | 429/463 |
| 2002/0122970 A1 * | 9/2002 | Inoue et al. | 429/35 |
| 2004/0209150 A1 | 10/2004 | Rock et al. | |
| 2007/0134538 A1 * | 6/2007 | Yuichi et al. | 429/35 |

FOREIGN PATENT DOCUMENTS

WO    2008001755 A1    1/2008

* cited by examiner

*Primary Examiner* — Patrick Ryan
*Assistant Examiner* — Julian Anthony
(74) *Attorney, Agent, or Firm* — Fraser Clemens Martin & Miller LLC; J. Douglas Miller

(57) ABSTRACT

A unitized electrode assembly for a fuel cell comprising an electrolyte membrane and a subgasket. The subgasket maximizing an operating life of the electrolyte membrane, militating against adverse effects of membrane expansion during use of the fuel cell and membrane shearing under unitized electrode assembly compression.

20 Claims, 5 Drawing Sheets

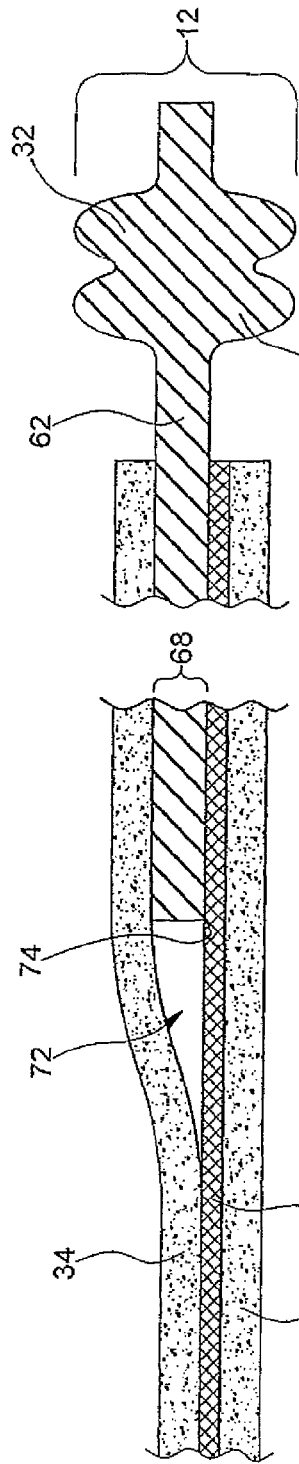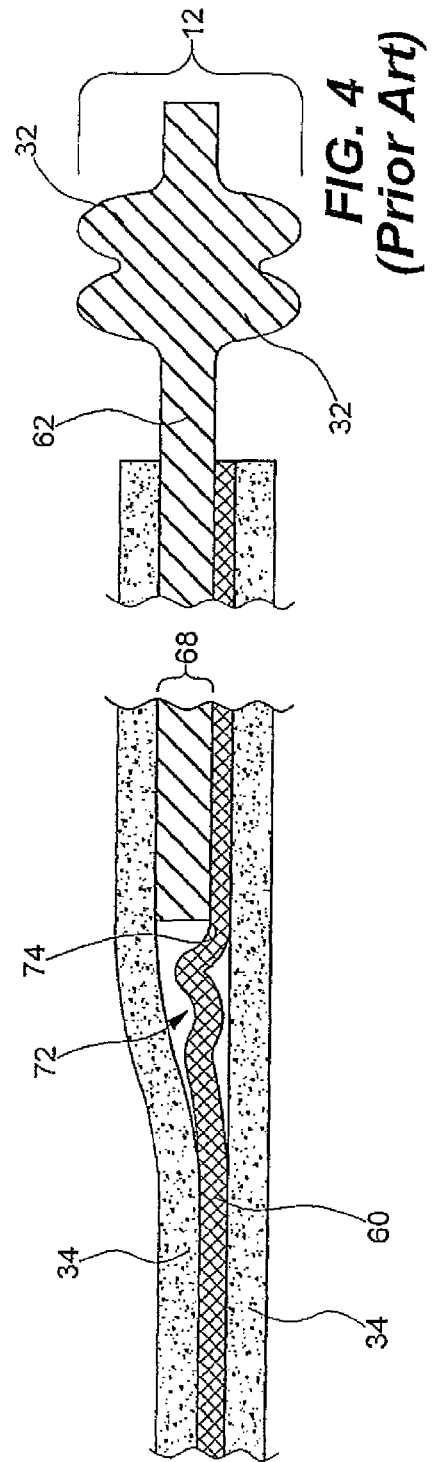

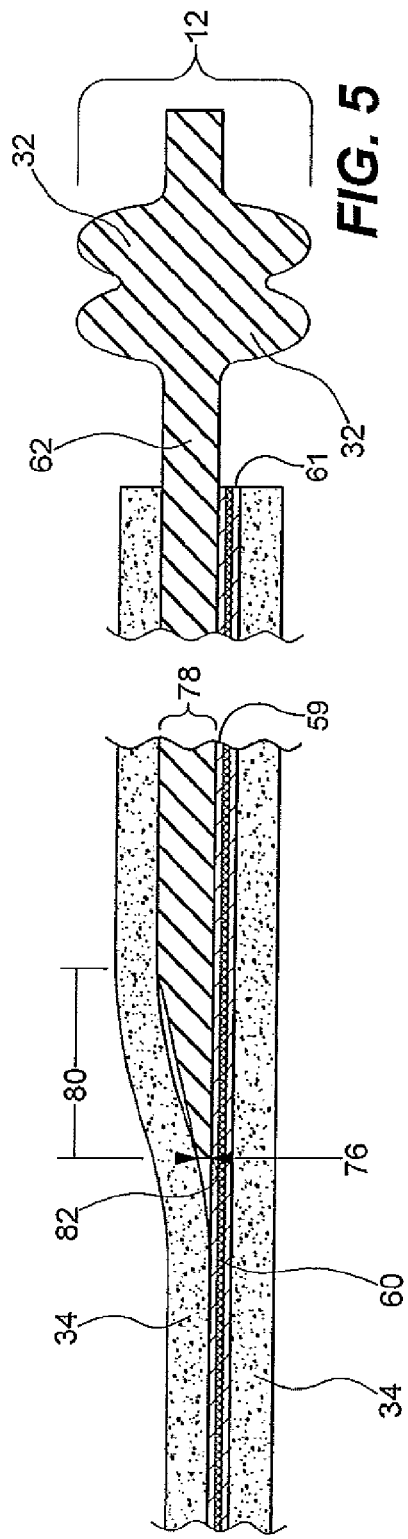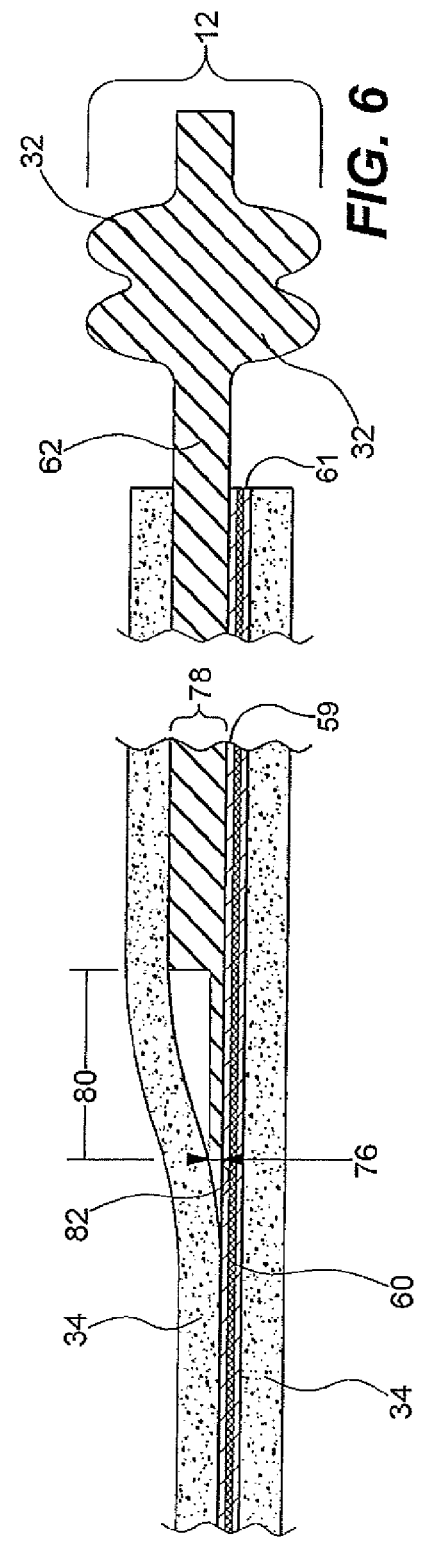

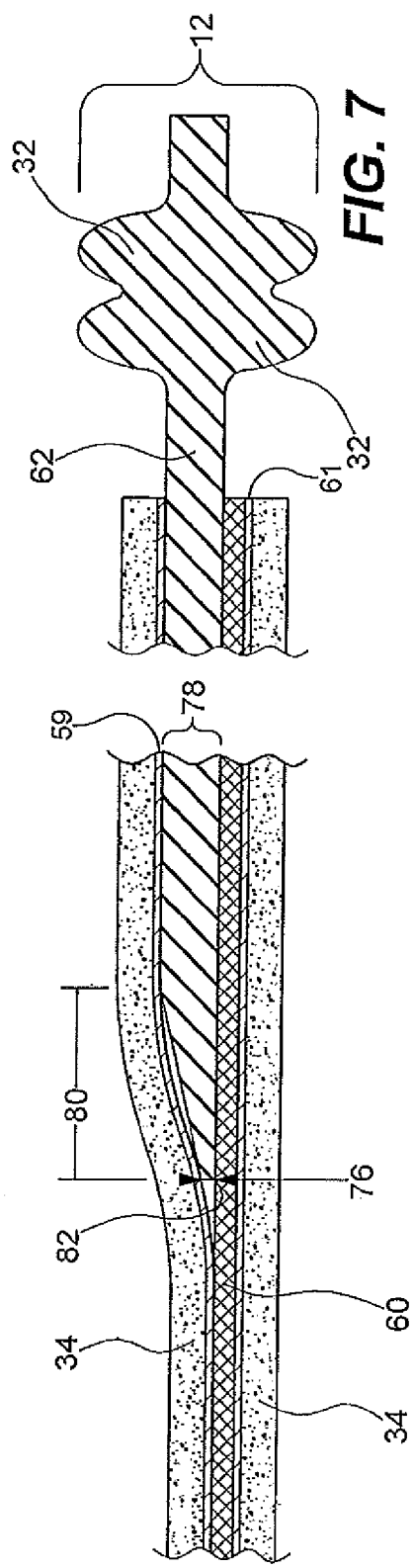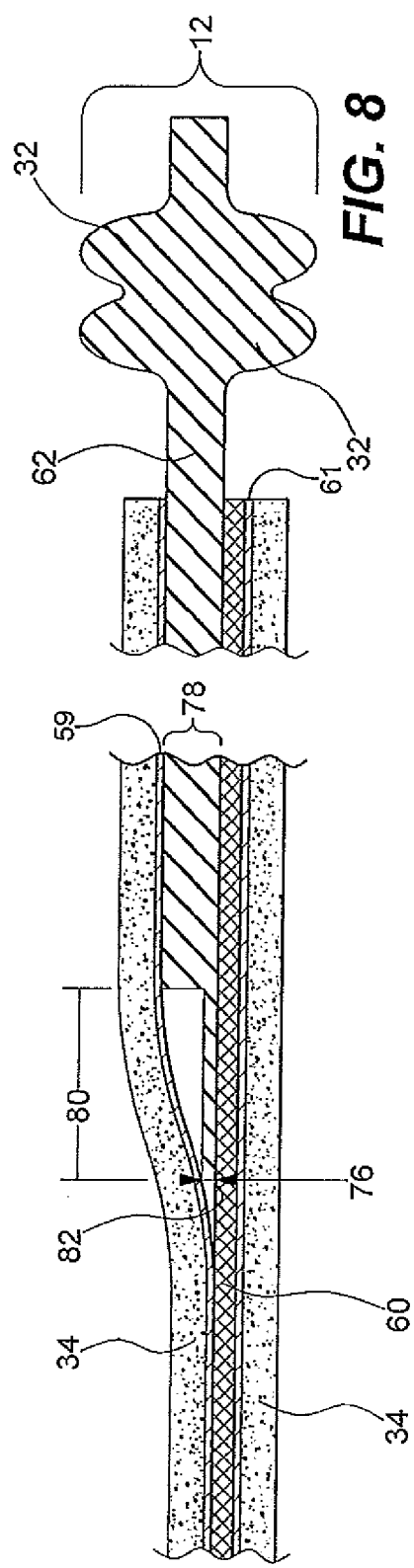

SUBGASKET WINDOW EDGE DESIGN RELIEF

FIELD OF THE INVENTION

The present disclosure relates to a fuel cell assembly and more particularly to subgaskets used in membrane assemblies.

BACKGROUND OF THE INVENTION

Fuel cell systems are increasingly being used as a power source in a wide variety of applications. Fuel cell systems have been proposed for use in power consumers such as vehicles as a replacement for internal combustion engines, for example. Such a system is disclosed in commonly owned U.S. patent application Ser. No. 10/418,536, hereby incorporated herein by reference in its entirety. Fuel cells may also be used as stationary electric power plants in buildings and residences, as portable power in video cameras, computers, and the like. Typically, the fuel cells generate electricity used to charge batteries or to provide power for an electric motor.

Fuel cells are electrochemical devices which combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example.

The term "fuel cell" is typically used to refer to either a single cell or a plurality of cells depending upon the context in which it is used. The plurality of cells is typically bundled together and arranged to form a stack with the plurality of cells commonly arranged in electrical series. Since single fuel cells can be assembled into stacks of varying sizes, systems can be designed to produce a desired energy output level providing flexibility of design for different applications.

A common type of fuel cell is known as a proton exchange membrane (PEM) fuel cell. The PEM fuel cell includes a unitized electrode assembly (UEA) disposed between a pair of bipolar plates. The UEA comprises anode and cathode diffusion media (DM), anode and cathode electrodes, and an electrolyte membrane. The order of the UEA components is critical for fuel cell operation. Respectively, the order of the components is: the anode DM, the anode electrode, the electrolyte membrane, the cathode electrode, and the cathode DM. The cathode and anode electrodes typically include a finely divided catalyst, such as platinum, supported on carbon particles and mixed with an ionomer. The electrolyte membrane may be disposed against a subgasket that follows a periphery of the fuel cell plate. The subgasket may be a stiff film having electrical insulating properties. The DM facilitates a delivery of gaseous reactants, typically the hydrogen and the oxygen, to an active region defined by an inner edge of the subgasket of the UEA for an electrochemical fuel cell reaction. The DM also aids in the management of water byproduct within the fuel cell. The subgaskets separate the fuel cell into an anode side and a cathode side, and electrically insulate the anode side from the cathode side. A sealing portion disposed on the subgasket militates against the gaseous reactants from escaping the fuel cell. The UEA components may be laminated together to form the UEA.

The UEA is disposed between the pair of bipolar plates, which act as current collectors for the fuel cell. The pair of bipolar plates each have respective ports and feed regions, for the supply and exhaust of the gaseous reactants. The feed regions act to distribute or collect the gaseous reactants within the fuel cell. The supply feed region includes supply ports that distribute the gaseous reactants from a supply manifold to the active region of the fuel cell via a flow field formed by a plurality of channels in the bipolar plate. The opposing, or outlet end of the bipolar plate has an exhaust feed region that includes exhaust ports where collected gaseous reactants leave the fuel cell and enter an exhaust manifold. The subgasket may be used to provide electrical insulation between the bipolar plates. In the area of the feed regions the stiffness of the subgasket is an important factor in producing the proper interface between the plurality of flow channels and the subgasket. The subgasket must be sufficiently stiff as to militate against the subgasket from intruding into and restricting the plurality of channels forming the feed regions.

The stack, which can contain more than one hundred plates, is compressed, and the elements held together by any conventional fastening means and anchored to clamping plates at the ends of the stack. In order to militate against undesirable leakage of fluids, the sealing portion is compressed between the plate assemblies. The sealing portion is disposed along a peripheral edge of both sides of the subgasket and may be integrally formed with the subgasket. The UEA is secured by the use of stack compression and a land formed in the plate, which corresponds to the sealing portion of the UEA. Prior art subgaskets have incorporated designs having a constant thickness from the active region of a fuel cell, across and past the sealing portion. The prior art subgaskets, despite being functional, may result in a shortened life of a fuel cell in many ways. The prior art subgaskets may be relatively thick (a thick subgasket) when compared to a thickness of the membrane. A high contrast of thickness between the thick subgasket and the membrane may lead to a localized area of high compression. The localized areas of high compression may lead to crushed DM, cracked anodes or cathodes, plate deformation, and shearing of the electrolyte membrane, any of which may lead to a premature failure of the fuel cell or a poor performance thereof. Alternately, the prior art subgaskets may be relatively thin (a thin subgasket) when compared to a thickness of the membrane. A low contrast of thickness between the thin subgasket and the membrane may lead to an excessive deflection of the subgasket by a flow of reactant gases.

Generally, the membrane may mechanically fail at the subgasket as a result of one of a UEA over-compression and a UEA under-compression. Swelling of the membrane may cause one of the UEA over-compression and the UEA under-compression. Electrolyte membranes require certain humidity levels within a fuel cell for proper operation. In anticipation of fuel cell start up or shut down, the humidity levels may be varied as desired for optimal performance of the fuel cell. Membranes within the fuel cell may absorb water, causing membrane dimensions to vary with humidity. Conversely, the subgaskets maintain excellent dimensional stability with variances in humidity. Particularly, repeated expansion and contraction of the membrane at the contact edge of a thick subgasket and the electrolyte membrane in the fuel cell may lead to shortened fuel cell life.

Failure of the membrane as a result of the UEA over-compression may be caused by a swelling of the membrane as well as manufacturing processes used to form the UEA. The swelling of the membrane may affect a length, a width, and a thickness of the membrane. The UEA over-compression may be caused by the thickness of the membrane increasing as a result of the swelling. The thickness of the membrane increasing as a result of the swelling creates a compressive load variance across the UEA. The compressive load variance across the UEA creates a stress concentration at the inner subgasket edge. The stress concentration at the inner subgasket edge negatively affects a life of the membrane. Additionally, the thickness of the membrane increasing as a result of the swelling may increase the compressive load on the UEA in the subgasket area, causing a permanent deformation of the bipolar plate and adjacent DM.

Additionally, the manufacturing processes of the UEA requiring compressive forces may damage the electrolyte membrane. Production of the UEA typically involves hot pressing of the components, bonding them together. Hot pressing may cause the inner subgasket edge to shear the electrolyte membrane along the contact edge of the subgaskets and the electrolyte membrane.

A shear in the electrolyte membrane may result in a crossover leak (loss of an anode to cathode gas barrier) or a short (where adjacent DM sheets or electrodes make a direct or electrical contact).

Failure of the membrane as a result of the UEA undercompression may occur in a tenting region adjacent the inner subgasket edge. The tenting region is an area of the UEA adjacent the subgasket edge where the compressive load on the membrane is significantly reduced or eliminated. The DM may act to bridge the step formed by an inner edge thickness of the subgasket. The DM may flexibly conform across the step formed by an inner edge thickness of the subgasket, resulting in a wedge shaped span located within the tenting region. Upon humidification of the membrane, the length and the thickness of the membrane may increase. The humidified membrane may swell into the tenting region. As a result of the UEA under-compression, the membrane may buckle. A buckling of the membrane may cause one of the anode electrode and the cathode electrode formed thereon to crack.

It would be desirable to produce a UEA for a fuel cell having a subgasket, wherein the subgasket militates against effects of membrane expansion, prolongs an operating life of the UEA, and militates against membrane shearing during UEA compression.

SUMMARY OF THE INVENTION

Presently provided by the invention, a UEA for a fuel cell having a subgasket that prolongs the operating life of the UEA, and militates against adverse effects of membrane expansion and membrane shearing during UEA compression, is surprisingly discovered.

In a first embodiment, the unitized electrode assembly for a fuel cell comprises an electrolyte membrane and a subgasket disposed adjacent the electrolyte membrane, at least a portion of a peripheral edge of the subgasket having a first thickness and a remainder of the subgasket having a second thickness, the second thickness greater than the first thickness.

In another embodiment, the unitized electrode assembly for a fuel cell comprises an electrolyte membrane, a subgasket disposed adjacent the electrolyte membrane, at least a portion of a peripheral edge of the subgasket having a first thickness and a remainder of the subgasket having a second thickness, the second thickness greater than the first thickness, and a diffusion media, a first portion of the diffusion media disposed adjacent the electrolyte membrane and a second portion of the diffusion media disposed adjacent the portion of the peripheral edge of the subgasket.

In a further embodiment, the unitized electrode assembly for a fuel cell comprises an electrolyte membrane, a subgasket disposed adjacent the electrolyte membrane, at least a portion of a peripheral edge of the subgasket is one of a beveled portion and a stepped portion having a first thickness and a remainder of the subgasket having a second thickness, the second thickness greater than the first thickness, and a diffusion media, a first portion of the diffusion media disposed adjacent the electrolyte membrane and a second portion of the diffusion media disposed adjacent the portion of the peripheral edge of the subgasket.

DRAWINGS

The above, as well as other advantages of the present invention, will become readily apparent to those skilled in the art from the following detailed description of embodiments of the invention when considered in the light of the accompanying drawings in which:

FIG. 3 is a fragmentary side, cross-sectional view of the unitized electrode assembly illustrated in FIG. 2 taken along line 3-3;

FIG. 4 is a fragmentary side, cross-sectional view of the unitized electrode assembly illustrated in FIG. 3, the electrolyte membrane shown in a humidified and buckled state;

FIG. 5 is a fragmentary side, cross-sectional view of a unitized electrode assembly according to an embodiment of the present disclosure;

FIG. 6 is a fragmentary side, cross-sectional view of the unitized electrode assembly according to another embodiment of the present disclosure;

FIG. 7 is a fragmentary side, cross-sectional view of a unitized electrode assembly according to another embodiment of the present disclosure; and FIG. 8 is a fragmentary side, cross-sectional view of the unitized electrode assembly according to another embodiment of the present disclosure.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
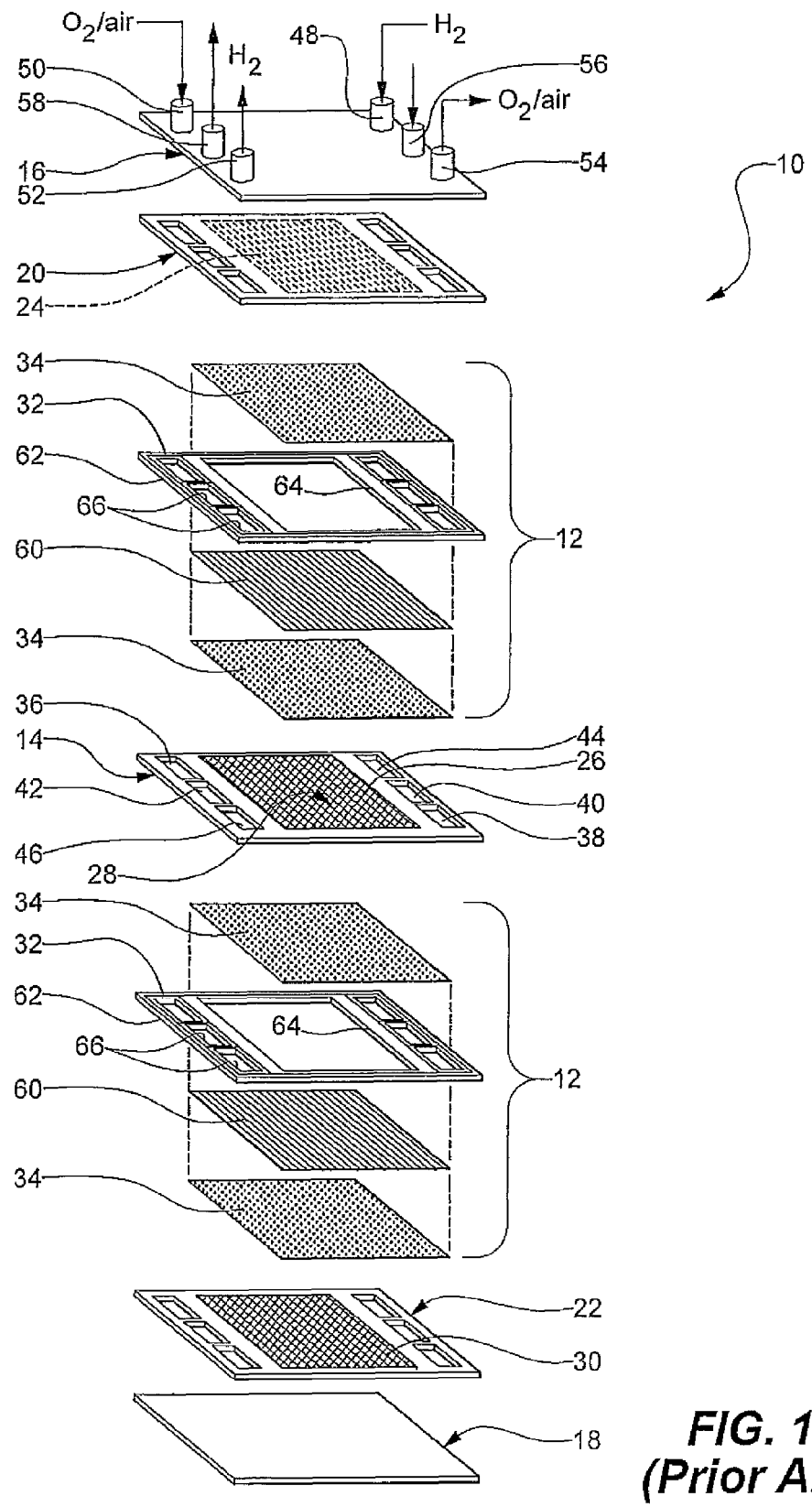
FIG. 1 is an exploded perspective view of an illustrative fuel cell stack known in the art.

FIG. 1 depicts an illustrative fuel cell stack 10 having a pair of UEAs 12 separated from each other by an electrically conductive bipolar plate 14. For simplicity, only a two-cell stack (i.e. one bipolar plate) is illustrated and described in FIG. 1, it being understood that the typical fuel cell stack 10 will have many more such cells and bipolar plates.

The UEAs 12 and bipolar plate 14 are stacked together between a pair of clamping plates 16, 18 and a pair of unipolar end plates 20, 22. The clamping plates 16, 18 are electrically insulated from the end plates 20, 22 by a seal or a dielectric coating (not shown). The unipolar end plate 20, both working faces of the bipolar plate 14, and the unipolar end plate 22 include respective active areas 24, 26, 28, 30. The active areas 24, 26, 28, 30 are typically flow fields for distributing gaseous reactants such as hydrogen gas and air over an anode 61 (shown in FIGS. 5-8) and a cathode 59 (shown in FIGS. 5-8), respectively, of the UEAs 12.

The bipolar plate 14 is typically formed by a conventional process for shaping sheet metal such as stamping, machining, molding, or photo etching through a photolithographic mask, for example. In one embodiment, the bipolar plate 14 is formed from unipolar plates which are then joined by any conventional process such as welding or adhesion. It should be further understood that the bipolar plate 14 may also be formed from a composite material. In one particular embodiment, the bipolar plate 14 is formed from a graphite or graphite-filled polymer.

A plurality of nonconductive sealing portions 32, a component of the UEAs 12, militate against fuel cell leakage and provides electrical insulation between the several components of the fuel cell stack 10. Gas-permeable diffusion media 34 are disposed adjacent the UEAs 12. The end plates 20, 22 are also disposed adjacent the diffusion media 34, respectively, while the active areas 26, 28 of the bipolar plate 14 are disposed adjacent the diffusion media 34.

The bipolar plate 14, unipolar end plates 20, 22, and the UEAs 12 each include a cathode supply aperture 36 and a cathode exhaust aperture 38, a coolant supply aperture 40 and a coolant exhaust aperture 42, and an anode supply aperture 44 and an anode exhaust aperture 46. Supply manifolds and exhaust manifolds of the fuel cell stack 10 are formed by an alignment of the respective apertures 36, 38, 40, 42, 44, 46 in the bipolar plate 14, unipolar end plates 20, 22, and the UEAs 12. The hydrogen gas is supplied to an anode supply manifold via an anode inlet conduit 48. The air is supplied to a cathode supply manifold of the fuel cell stack 10 via a cathode inlet conduit 50. An anode outlet conduit 52 and a cathode outlet conduit 54 are also provided for an anode exhaust manifold and a cathode exhaust manifold, respectively. A coolant inlet conduit 56 is provided for supplying liquid coolant to a coolant supply manifold. A coolant outlet conduit 58 is provided for removing coolant from a coolant exhaust manifold. It should be understood that the configurations of the various inlets 48, 50, 56 and outlets 52, 54, 58 in FIG. 1 are for the purpose of illustration, and other configurations may be chosen as desired.

Figure 2:
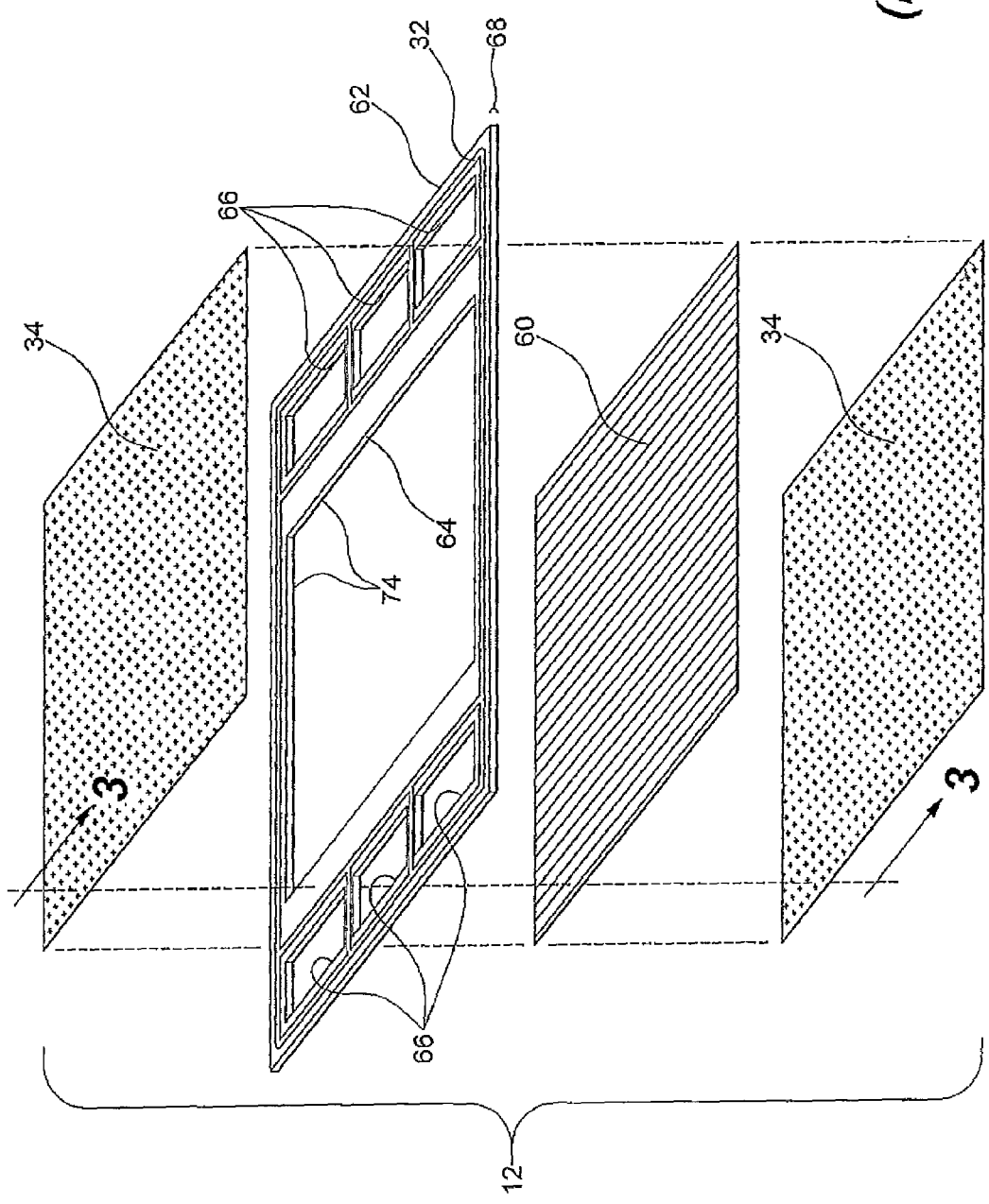
FIG. 2 is an exploded perspective view of an illustrative unitized electrode assembly shown in FIG. 1.

UEAs 12 for use in a fuel cell may include a plurality of components. In a non-limiting examples shown in FIGS. 5-8, the UEA includes an anode 61 and a cathode 59, an electrolyte membrane 60, a subgasket 62, the plurality of sealing portions 32, and the diffusion media 34. The components of the UEA 12 are assembled during production of the UEA 12 and affixed to one another by any conventional process such as hot pressing, for example. An adhesive may be used between individual components where necessary. For clarity, the diffusion media 34 and electrolyte membrane 60 in FIGS. 1 and 2 have been linearly displaced 12 to show the electrolyte membrane 60.

The anode 61 and the cathode 59 of the fuel cell may be formed by a disposal of a catalyst ink on one of the electrolyte membrane 60, as shown in FIGS. 5-6, and the diffusion media 34, as shown in FIGS. 7-8. The catalyst ink may be applied to the components by any conventional process such as spraying, dipping, brushing, roller transfer, slot die coating, gravure coating, Meyer rod coating, decal transfer, and printing, for example. The catalyst ink is applied to a side of the component facing the electrolyte membrane 60. One of the anode 61 and the cathode 59 can be referred to as an electrode.

The electrolyte membrane 60 may be a membrane layer, formed from an ionomer. Nafion® NRE211 is a typical ionomer well known in the art for use as the electrolyte membrane 60 of a fuel cell. The electrolyte membrane 60 is disposed on one of a first and a second side of the subgasket 62. A primary subgasket aperture 64 substantially corresponding to the active areas 24, 26, 28, 30 of the bipolar plate 14 and the unipolar plate 20, 22 is covered by the electrolyte membrane 60.

The subgasket 62 may be formed from a polymeric film and in the form of a layer. As a nonlimiting example, the polymeric film may be one formed from one of polyethylene terephthalate and polyethylene naphthalate. Other thin films having electrical insulating properties may be used to form the subgasket 62 as well. The subgasket 62 may substantially follow a periphery of the bipolar plate 14 and the unipolar plate 20, 22, and have a plurality of secondary subgasket apertures 66 formed therein corresponding to the apertures 36, 38, 40, 42, 44, 46. The subgasket 62 provides a mounting surface for the electrolyte membrane 60 and the diffusion media 34 and allows one of the bipolar plate 14 and the unipolar plate 20, 22 to be electrically insulated from an adjacent plate.

As illustrated in FIG. 3, specific dimensions of the subgasket 62 may be important for providing adequate sealing between the plates 14, 20, 22 of a fuel cell stack 10. Additionally, specific dimensions may be necessary to militate against adverse effects of electrolyte membrane 60 expansion and electrolyte membrane 60 shearing under compression of the UEA 12. It is well known in the art that a single thickness 68 of the subgasket 62 may affect the fuel cell performance. A tenting region 72 may be formed between the diffusion media 34 and the electrolyte membrane 60. The tenting region is a portion of the UEA that may be exposed to a low compressive pressure when compared to the active areas 24, 26, 28, 30. Additionally, the tenting region 72 may be characterized by a lack of contact between the UEA components. The subgasket 62 having the single thickness 68 may be too rigid to optimize a life of the UEA 12. Expansion of the electrolyte membrane 60 may cause a contact edge 74 to damage the electrolyte membrane 60 where the subgasket 62 is too rigid. Additionally, repeated expansion and contraction of the electrolyte membrane 60 may cause excessive wear of the electrolyte membrane 60 along the contact edge 74 when a UEA overcompression is present.

The tenting region 72 is a cavity formed adjacent the contact edge 74, the subgasket 62, the electrolyte membrane 60, and the diffusion media 34 and having a substantially triangular cross sectional shape. Minimization of a total cross sectional area of the tenting region 72 is desired to militate against excessive wear and premature failure of one of the electrolyte membrane 60 and diffusion media 34. When the single thickness 68 is too small, the subgasket 62 may be subjected to an excessive deflection caused by a flow of gaseous reactants where the diffusion media 34 is not present. When excessively deflected, the subgasket 62 may enter and restrict gaseous reactant communication to and from the active areas 24, 26, 28, 30 of one of the bipolar plate 14 and the unipolar plate 20, 22. Prior art subgaskets have used the single thickness 68 of approximately 0.08 to 0.13 millimeters. However, other thicknesses can be used.

FIG. 4 illustrates the electrolyte membrane 60 in a humidified and buckled state. Upon humidification, the electrolyte membrane 60 may increase in thickness, length, and width. Bounded by the subgasket 62 onto which the electrolyte membrane 60 is attached, expansion of the electrolyte membrane 60 causes the electrolyte membrane 60 to swell and buckle within the tenting region 72. The electrolyte membrane 60 swells unconstrained into the tenting region 72, freed from a substantially uniform compressive force exerted on the UEA 12 in the area of the subgasket 62 and the active areas 24, 26, 28, 30. Electrodes formed on the electrolyte membrane 60, may crack when the electrolyte membrane 60 buckles. Likewise, an expanding thickness of the electrolyte membrane 60 may increase the compressive force exerted by the contact edge 74 on the electrolyte membrane 60, resulting in one of a fret or a tear in the electrolyte membrane 60. Additionally, the increased compressive force due to the expanding electrolyte membrane 60 may force the subgasket 62 and the diffusion media 34 into an adjacent fuel cell plate, damaging one of the adjacent plate and diffusion media 34.

A compressive force exerted on the UEA 12 may cause similar failures. The compressive force may be created during manufacture of the UEA 12 or may be present in the fuel cell stack 10 after assembly. The compressive force may push the electrolyte membrane 60 into the contact edge 74 resulting in a thinning of the electrolyte membrane 60. Likewise, the compressive force may push the subgasket 62 and the diffusion media 34 into the adjacent fuel cell plate, damaging one of the adjacent plate and diffusion media 34.

As shown in FIGS. 5 and 6, an edge relief according to the present invention is incorporated into the subgasket 62, forming a first thickness 76 and a second thickness 78. The second thickness 78 of the subgasket is greater than the first thickness 76. The remainder of the subgasket 62 may be substantially formed to have the second thickness 78. The second thickness 78 of the subgasket 62 may be disposed along the periphery of the bipolar plate 14 and the unipolar plate 20, 22 and along a periphery of the secondary subgasket 62 apertures 66. The first thickness 76 of the subgasket 62 may be disposed along a periphery of the primary subgasket 62 aperture of the bipolar plate 14 and the unipolar plate 20, 22. The first thickness 76 may also be disposed along other subgasket 62 edges, as desired.

Favorable results have been obtained where the first thickness 76 is substantially equal to about one third or less of the second thickness 78. Favorable results have also been obtained where a membrane 60 thickness is substantially equal to about two thirds or less of the first thickness 76. A ratio of about one to three for the first thickness 76 to the second thickness 78 minimizes the tenting region 72 without exposing the subgasket 62 to excessive deflection. Additionally, an edge relief according to the present invention allows the relief contact edge 82 to have the first thickness 76 as opposed to the second thickness 78. A relief contact edge 82 having a first thickness allows the diffusion media 34 to transition from the second thickness 78 to the first thickness 76 while minimizing the tenting region 72. As a nonlimiting example, the first thickness 76 of no more than 0.03 millimeters and the second thickness 78 of 0.08 millimeters may be particularly beneficial for the active areas 24, 26, 28, 30 and the feed regions of the particular plates 14, 20, 22. As a second nonlimiting example, the edge relief having a transition length 80 in the range of 0.5 to 1.0 millimeters from the first thickness 76 to the second thickness 78, determined by a stiffness of the diffusion media 34 may minimize the tenting region 72 without exposing the subgasket 62 to excessive deflection. As a third nonlimiting example, the edge relief having a transition length 80 substantially equal to 5 times a difference of the second thickness 78 and the first thickness 76, determined by a stiffness of the diffusion media 34 may minimize the tenting region 72 without exposing the subgasket 62 to excessive deflection.

The edge relief may be formed by one of a bevel or a step formed in the subgasket. The bevel edge relief design is illustrated in FIG. 5 and the step edge relief is illustrated in FIG. 6. The subgasket 62 having one of the bevel and the step may be formed by any conventional process such as thermoforming, laser ablation, and thin film lamination. The subgasket 62 may be thermoformed to include one of the bevel and the step. When the subgasket 62 is thermoformed, a sheet of thin film is heated and pressed against a mold surface. When the thin film has cooled, excess material is removed by trimming. Alternately, material may be removed from the subgasket 62 to form one of the bevel and the step. An unfinished subgasket having the second thickness 78 may be exposed to a laser to form one of the bevel and the step. Known as laser ablation, the process sublimates the thin film to form the finished subgasket 62. Furthermore, the subgasket 62 may be constructed from a plurality of layers, one of the layers having the first thickness 76 and both of the layers having the second thickness 78. The layers may be formed from a polymeric film or other thin films having electrical insulating properties. One of an adhesive, an epoxy, and a hot melt are applied to at least one of the layers which is subsequently disposed on another layer. Alternately, a plurality of layers may be fused together where a material property of the plurality of layers permits. The layers laminated together form the subgasket 62. Known as thin film lamination, the process may be used to form the subgasket 62 having the step.

The plurality of sealing portions 32 may be formed from a resilient material and is disposed on a side of the subgasket 62. The sealing portions 32 may be integrally formed with the subgasket 62 or may be formed separately and attached through the application of one of an adhesive, an epoxy, and a hot melt to one of the sealing portions 32 and the subgasket 62. The sealing portions 32 may be disposed along the periphery of the bipolar plate 14 and the unipolar plate 20, 22 and around the secondary subgasket apertures 66. When the fuel cell stack 10 is under a compressive force the sealing portions 32 militate against fuel cell leakage and provide electrical insulation between the several components of the fuel cell stack 10.

The diffusion media 34 are disposed on a side of the subgasket 62 and may be formed from a conductive, and gas permeable material such as carbon fabric or paper. The diffusion media 34 serve as current collectors for the anode 61 and cathode 59 as well as provide mechanical support for the electrolyte membrane 60. The diffusion media 34 encompasses an area greater than the primary subgasket aperture 64 and overlaps the edge relief. The diffusion media 34 may extend substantially outward past the edge relief towards at least one of the sealing portions 32. During UEA 12 manufacture, the diffusion media 34 may be partially bonded to the subgasket 62.

While certain representative embodiments and details have been shown for purposes of illustrating the invention, it will be apparent to those skilled in the art that various changes may be made without departing from the scope of the disclosure, which is further described in the following appended claims.

What is claimed is:

1. A unitized electrode assembly for a fuel cell, comprising:
   a gas permeable diffusion media;
   an electrolyte membrane having at least one of an anode and a cathode at least partially disposed adjacent thereto; and
   a subgasket at least partially disposed between the electrolyte membrane and the diffusion media, a first portion of a peripheral edge of the subgasket having a first thickness and a second portion of the peripheral edge of the subgasket having a second thickness, the second thickness greater than the first thickness, wherein the first portion and the second portion of the peripheral edge of the subgasket at least partially abut at least one of the electrolyte membrane, the anode, and the cathode.

2. The unitized electrode assembly for a fuel cell according to claim 1, wherein the first portion of the peripheral edge of the subgasket is one of a beveled portion and a stepped portion.

3. The unitized electrode assembly for a fuel cell according to claim 2, wherein a width of one of the beveled portion and the stepped portion is between 0.5 millimeters and 1.0 millimeters.

4. The unitized electrode assembly for a fuel cell according to claim 2, wherein a width of one of the beveled portion and the stepped portion is about 5 times a difference of the second thickness and the first thickness.

5. The unitized electrode assembly for a fuel cell according to claim 1, wherein the subgasket is formed from a polymeric film.

6. The unitized electrode assembly for a fuel cell according to claim 1, wherein the subgasket is produced by one of thermoforming, laser ablation, and lamination.

7. The unitized electrode assembly for a fuel cell according to claim 1, wherein the first thickness is one of less than and about 0.025 millimeters.

8. The unitized electrode assembly for a fuel cell according to claim 1, wherein the membrane assembly is produced by hot pressing the electrolyte membrane, the subgasket, and the diffusion media.

9. The unitized electrode assembly for a fuel cell according to claim 1, wherein the subgasket includes a sealing portion disposed along the subgasket peripheral edge.

10. The unitized electrode assembly for a fuel cell according to claim 1, wherein the first thickness is substantially equal to about one third of the second thickness.

11. The unitized electrode assembly for a fuel cell according to claim 1, wherein the first thickness defines an active area edge of the electrolyte membrane.

12. The unitized electrode assembly for a fuel cell according to claim 1, wherein the diffusion media is disposed adjacent one of a bipolar plate and an end plate of the fuel cell.

13. A unitized electrode assembly for a fuel cell, comprising:
   a gas permeable first diffusion media;
   a gas permeable second diffusion media;
   an electrolyte membrane disposed between the first diffusion media and the second diffusion media, the electrolyte membrane having at least one of an anode and a cathode at least partially disposed adjacent thereto; and
   a subgasket at least partially disposed between the electrolyte membrane and one of the first diffusion media and the second diffusion media, a first portion of a peripheral edge of the subgasket having a first thickness and a second portion of the peripheral edge of the subgasket having a second thickness, wherein the second thickness is greater than the first thickness, and wherein the first portion and the second portion of the peripheral edge of the subgasket at least partially abut at least one of the electrolyte membrane, the anode, and the cathode.

14. The unitized electrode assembly for a fuel cell according to claim 13, wherein the first portion of the peripheral edge of the subgasket is one of a beveled portion and a stepped portion.

15. The unitized electrode assembly for a fuel cell according to claim 13, wherein a width of one of the beveled portion and the stepped portion is between 0.5 millimeters and 1.0 millimeters.

16. The unitized electrode assembly for a fuel cell according to claim 13, wherein a width of one of the beveled portion and the stepped portion is about 5 times a difference of the second thickness and the first thickness.

17. The unitized electrode assembly for a fuel cell according to claim 13, wherein the first thickness is one of less than and about 0.025 millimeters.

18. The unitized electrode assembly for a fuel cell according to claim 13, wherein the first thickness defines an active area edge of the electrolyte membrane.

19. The unitized electrode assembly for a fuel cell according to claim 13, wherein at least one of the first diffusion media and the second diffusion media is disposed adjacent one of a bipolar plate and an end plate of the fuel cell.

20. A unitized electrode assembly for a fuel cell, comprising:
   a gas permeable first diffusion media;
   a gas permeable second diffusion media;
   an electrolyte membrane disposed between the first diffusion media and the second diffusion media, the electrolyte membrane having at least one of an anode and a cathode at least partially disposed adjacent thereto; and
   a subgasket at least partially disposed between the electrolyte membrane and one of the first diffusion media and the second diffusion media, a first portion of a peripheral edge of the subgasket is one of a beveled portion and a stepped portion having a first thickness and a second portion of the peripheral edge of the subgasket having a second thickness, wherein the second thickness is greater than the first thickness, and wherein the first portion and the second portion of the peripheral edge of the subgasket at least partially abut at least one of the electrolyte membrane, the anode, and the cathode.

* * * * *